(No Model.)
G. W. JONES.
CAR WHEEL AXLE.
No. 401,280. Patented Apr. 9, 1889.
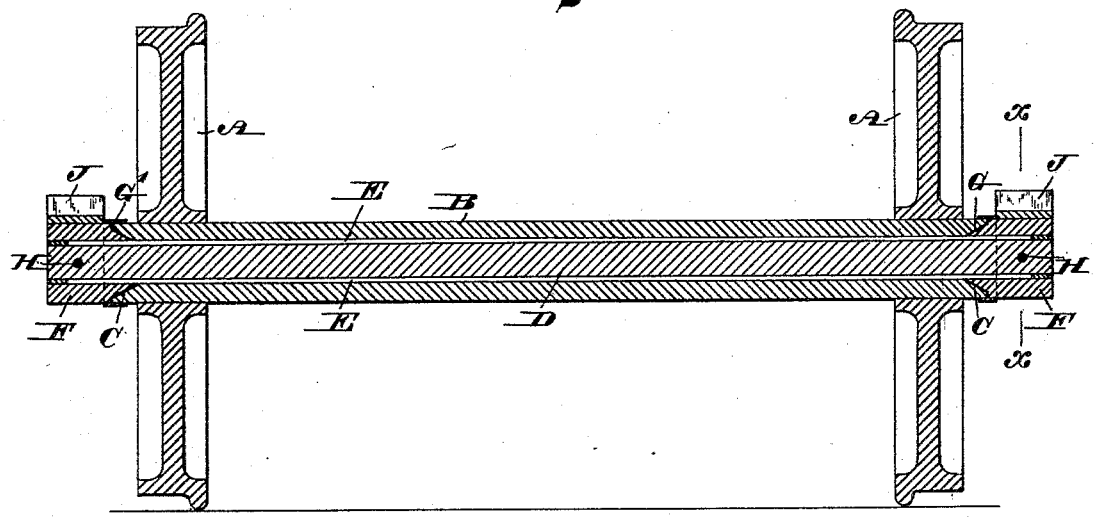
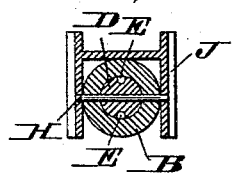
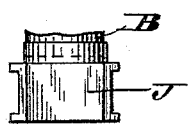
Witnesses
Theo. Rolle.
A. P. Jennings.
Inventor
George W. Jones
By his Attorneys
Diedersheim & Kintner

UNITED STATES PATENT OFFICE.

GEORGE W. JONES, OF PHILADELPHIA, PENNSYLVANIA.

CAR-WHEEL AXLE.

SPECIFICATION forming part of Letters Patent No. 401,280, dated April 9, 1889.

Application filed January 4, 1889. Serial No. 295,459. (No model.)

*To all whom it may concern:*

Be it known that I, GEORGE W. JONES, a citizen of the United States, residing in the city and county of Philadelphia, State of Pennsylvania, have invented a new and useful Improvement in Car-Wheel Axles, which improvement is fully set forth in the following specification and accompanying drawings.

My invention relates to improvements in car-wheel axles, the object being the provision of a durable and inexpensive axle having improved lubricating facilities, and which will have the proper bearing-surface to cause the axle to revolve smoothly and enable the turning of curves more readily and easily without undue strain upon the parts.

To attain the desired objects, the invention consists of car-wheels rigidly affixed to a hollow axle so as to revolve therewith, a spindle passing through the axle, forming the main bearing therefor, and conical or rounded side bearings formed by the contiguous ends of the axle and non-rotatable caps, hereinafter more particularly described; further, in providing said spindle with ducts, which carry the lubricant for the axle, and, finally, of the combination of the several parts.

Figure 1 represents a vertical sectional view of a car-wheel axle embodying my invention. Fig. 2 represents a vertical sectional view on line $x$ $x$ of Fig. 1. Fig. 3 represents a top view of the parts shown in Fig. 2. Fig. 4 represents a side elevation of one of the caps employed.

Similar letters of reference denote corresponding parts in the several figures.

Referring to the drawings, A designates the car-wheels, and B the hollow axle rigidly affixed to said wheels in order to revolve therewith. The ends C of the hollow axle are made conical, the purpose of which will appear.

D designates the spindle passing through the axle and extended at the ends, and said spindle is provided with grooves, channels, or passages E, which form ducts for the lubricant.

From this construction it will be observed that the axle rotates on the spindle and has its entire surface lubricated by means of the ducts E.

Encircling the ends of the spindle are caps F, having inner conical ends, G, which bear against the conical ends of the axle, and also having shoulders G' at the larger diameters of said conical ends. Thus the conical ends of the caps form shoulders, against which the extreme ends of the axle abut. The caps and spindles are made rigid by means of pins H, passing through the axle-boxes J and the caps and spindle, thus rigidly securing them to the axle-boxes and preventing movement of the same.

From the construction described it will be seen that the axle revolves on the spindle and is lubricated thereby, and also that said axle has a bearing-surface on the spindle and caps, which causes the axle to rotate smoothly, and will run for a long period with but little lubrication. Again, the spindle may be readily and quickly removed from the axle-box at either side of the car. The frictional contact or bearing-surface of the axle on the spindle is greater than at present, and consequently the wear is more evenly distributed. The lubricant reaches the entire bearing-surface, and the axle revolves more smoothly and easily than heretofore. Owing to the shoulders G' of the conical caps G, against which the extreme ends of the axle abut, all danger of the axle being damaged or broken by lateral thrust or strain is avoided.

Having thus described my invention, what I claim as new, and desire to secure by Letters Patent, is—

1. A car-wheel axle consisting of a hollow axle carrying the wheels, a spindle passing through said axle, forming a bearing therefor, and conical caps connected with the ends of the spindle and forming bearings for the ends of the axle, said ends also being conical, the parts being combined and serving for the purpose described.

2. A car-wheel axle consisting of a hollow axle having conical ends, a spindle passing through said axle, forming a bearing therefor, oil-ducts in said spindle for lubricating the axle, and caps secured to the spindle and having conical ends, with which the conical ends of the axle are in contact, said conical ends forming bearings, substantially as described.

3. In a car-axle, the combination, with the hollow axle, of a spindle on which said axle rotates, caps carried by the spindle and forming end bearings for the axle, and axle-boxes secured to the spindle and caps, preventing the same from turning, substantially in the manner described.

4. The conical caps G, with shoulders G', as described.

GEORGE W. JONES.

Witnesses:
JOHN A. WIEDERSHEIM,
WM. N. MOORE.